(12) United States Patent
He (10) Patent No.: US 10,207,374 B2
(45) Date of Patent: Feb. 19, 2019

(54) PACKAGE STRUCTURE FOR WELDING POWDER (71) Applicant: Ying Chun He, Ningbo (CN)

(72) Inventor: Ying Chun He, Ningbo (CN)

( * ) Notice: Subject to any disclaimer, the term of this patent is extended or adjusted under 35 U.S.C. 154(b) by 166 days.

(21) Appl. No.: 15/339,311

(22) Filed: Oct. 31, 2016

(65) Prior Publication Data
US 2017/0304965 A1 Oct. 26, 2017

(30) Foreign Application Priority Data
Apr. 22, 2016 (CN) .................... 2016 2 0399286 U (51) Int. Cl.
B65D 85/84 (2006.01)
B23K 37/00 (2006.01)
B65D 8/00 (2006.01)
B65D 25/34 (2006.01)
B65D 43/14 (2006.01)
B65D 51/24 (2006.01)
B65D 85/00 (2006.01)
B23K 103/12 (2006.01)

(52) U.S. Cl.
CPC ............... *B23K 37/00* (2013.01); *B65D 7/04* (2013.01); *B65D 25/34* (2013.01); *B65D 43/14* (2013.01); *B65D 51/24* (2013.01); *B65D 85/70* (2013.01); *B23K 2103/12* (2018.08)

(58) Field of Classification Search
CPC .......... B23K 37/02; B23K 3/00; B23K 37/00; B23K 9/324; B23K 2103/12; B65D 7/04; B65D 25/34; B65D 43/14; B65D 51/24; B65D 85/70; B65D 85/84
USPC ........... 206/524.3; 220/62.16, 62.17; 428/75; 164/271, 54
See application file for complete search history.

(56) References Cited

U.S. PATENT DOCUMENTS

| | | | | |
|---|---|---|---|---|
| 6,352,153 B1 * | 3/2002 | Ohashi | ................... | B65D 51/26 206/205 |
| 2004/0003907 A1 * | 1/2004 | Moore | ................... | B23K 23/00 164/54 |
| 2011/0198253 A1 * | 8/2011 | Sato | ................... | B65D 77/0406 206/372 |

FOREIGN PATENT DOCUMENTS

CN 201144064 Y * 11/2008
CN 104670718 A * 6/2015

* cited by examiner

*Primary Examiner* — Rafael A Ortiz (57) ABSTRACT

A package structure for welding powder has a casing and a casing cover. The casing cover is deposited on the cover. The casing and the casing cover are made of metallic copper. The casing cover has a protruding segment being cylindrical and formed on a bottom surface of the casing cover, and a mounting recess being round and formed in a top surface of the casing cover corresponding to the protruding segment for storing fine welding powder. The package structure has a fire strip deposited on the top surface of the casing cover and extending into the mounting recess via a top opening of the mounting recess, and a sealing sheet deposited on the top surface of the casing cover to hold the fire strip securely with the casing cover and seal the top opening of the mounting recess.

20 Claims, 11 Drawing Sheets

FIG.11

PACKAGE STRUCTURE FOR WELDING POWDER

BACKGROUND OF THE INVENTION

1. Field of the Invention

The present invention relates to a copper cable welding, and more particularly to a package structure for welding powder that may improve the success rate of ignition and the welding efficiency, may be used safely with long shelf life, may have good sealing without waste of materials, is environmentally friendly, may reduce the cost of preparing welding powder, and may provide a sufficient welding strength.

2. Description of Related Art

A conventional package structure for welding powder has a casing and a casing cover, and the casing cover is tightly mounted on the casing and has a thin portion formed on the casing cover for a fire strip inserted through the casing cover. The casing and the casing cover are made of metallic copper. The casing and the casing cover of the package structure are made of metallic copper to provide a good sealed packaging effect for the welding powder, and this prevents the welding powder from damping and deteriorating with a long shelf life, and can be transported conveniently and avoid contact with fire to increase the security during transportation.

In addition, the operation of the package structure is easy: during a welding process, the package structure is placed in a welding mold, the package structure is melted into copper water to form as a part of the welding powder, and this may enable the copper water to form with a copper cable as a single piece without any residues of copper. Then, the welding process is clean and environmentally friendly since the package structure can be used to replace the copper wires that are added in the welding powder, and in the manufacturing process of the welding powder, the copper wires need not be added in the welding powder and this will reduce the cost of preparing welding powder.

However, when the package structure is applied in the construction sites, occasionally one-time ignition is not feasible and multiple attempts of ignitions may be required since the particles of the welding powder are coarse or uneven, thus increasing the ignition time, affecting the using effect, and reducing the welding efficiency.

To overcome the shortcomings, the present invention tends to provide a package structure to mitigate or obviate the aforementioned problems.

SUMMARY OF THE INVENTION

The main objective of the invention is to provide a package structure for welding powder that may improve the success rate of ignition and the welding efficiency, may be used safely with long shelf life, may have good sealing without waste of materials, may be environmentally friendly, may reduce the cost of preparing welding powder, and may provide a sufficient welding strength.

The package structure for welding powder in accordance with the present invention has a casing and a casing cover. The casing cover is deposited on the cover. The casing and the casing cover are made of metallic copper. The casing cover has a protruding segment formed on and protruding from a bottom surface of the casing cover, and a mounting recess formed in a top surface of the casing cover corresponds to the protruding segment for storing fine welding powder. The package structure has a fire strip deposited on the top surface of the casing cover and extending into the mounting recess via a top opening of the mounting recess, and a sealing sheet deposited on the top surface of the casing cover to hold the fire strip securely with the casing cover and seal the top opening of the mounting recess. The protruding segment is cylindrical and is formed on and protrudes from the bottom surface of the casing cover at a center of the casing cover, and the mounting recess is round and is formed in the top surface of the casing cover at the center of the casing cover. The success rate of ignition and the welding efficiency can be improved, and the package structure may be used safely with long shelf life, have good sealing without waste of materials, may be environmentally friendly, may reduce the cost of preparing welding powder, and may provide a sufficient welding strength.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 4, a first embodiment of a package structure for welding powder in accordance with the present invention has a casing 1 and a casing cover 2.

Figure 6:
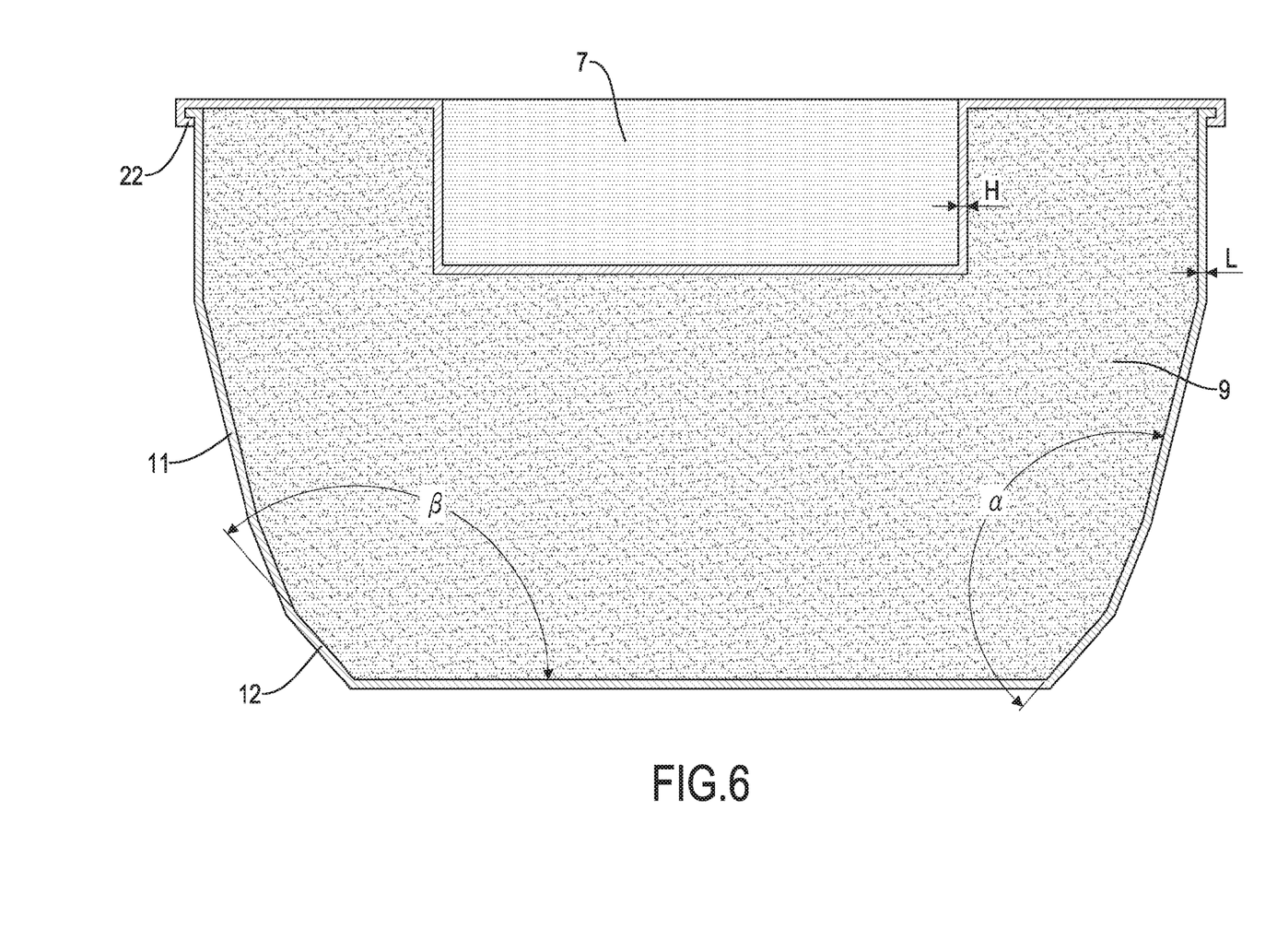
FIG. 6 is a cross-sectional side view of the casing and the casing cover of the package structure along line 6-6 in FIG. 5.
Figure 7:
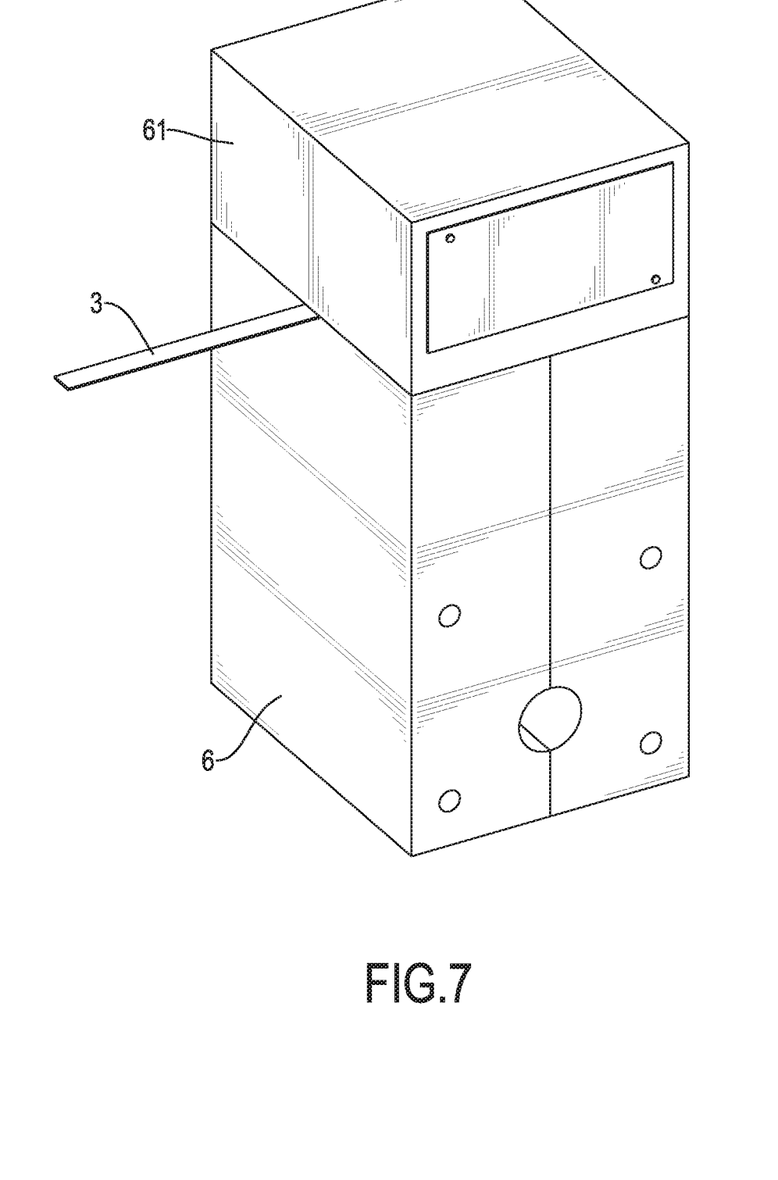
FIG. 7 is an operational perspective view of the package structure in FIG. 1, placed in a welding mold.
Figure 8:
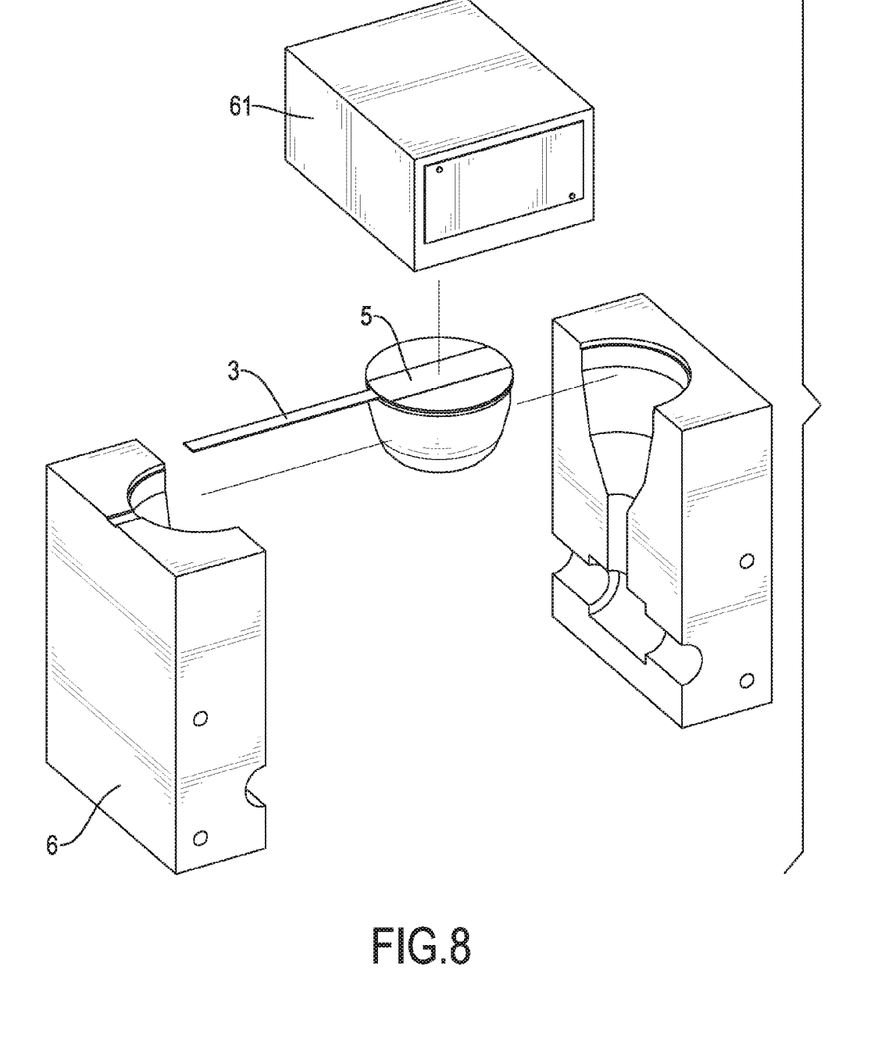
FIG. 8 is an exploded perspective view of the welding mold in FIG. 7.

The casing 1 is made of metallic copper, may be conical, and has a thickness L, an outer rim, an external surface, an upper tapered segment 11, and a lower tapered segment 12. The thickness L of the casing is between 0.1 and 0.5 millimeters. With reference to FIGS. 7 and 8, in a welding process, the package structure is deposited in a cavity of a welding mold 6, and the cavity of the welding mold 6 has a shape corresponding to a shape of the casing 1. Additionally, the casing 1 is composited by the upper tapered segment 11 and the lower tapered segment 12, and the upper tapered segment 11 and the lower tapered segment 12 are formed as a single piece by single stage stamping. An inclined angle α at a connecting position between the upper tapered segment 11 and the lower tapered segment 12 is between 130 and 140 degrees. A taper angle β of the lower tapered segment 12 is between 145 and 160 degrees. Furthermore, with reference to FIG. 6, the casing 1 is used to store welding powder 9.

The casing cover 2 is made of metallic copper, is deposited on the casing 1, and has a center, a bottom surface, a top surface, a thickness H, an external surface, a protruding segment, a mounting recess 21, and an outer periphery 22. The thickness H of the casing cover 2 is between 0.1 and 0.3 millimeters. The protruding segment may be cylindrical, is formed on and protrudes from the bottom surface of the casing cover 2 at the center of the casing cover 2, and has a thickness equal to the thickness H of the casing cover 2. Furthermore, the protruding segment is formed with the casing cover 2 as a single piece by stamping.

Figure 1:
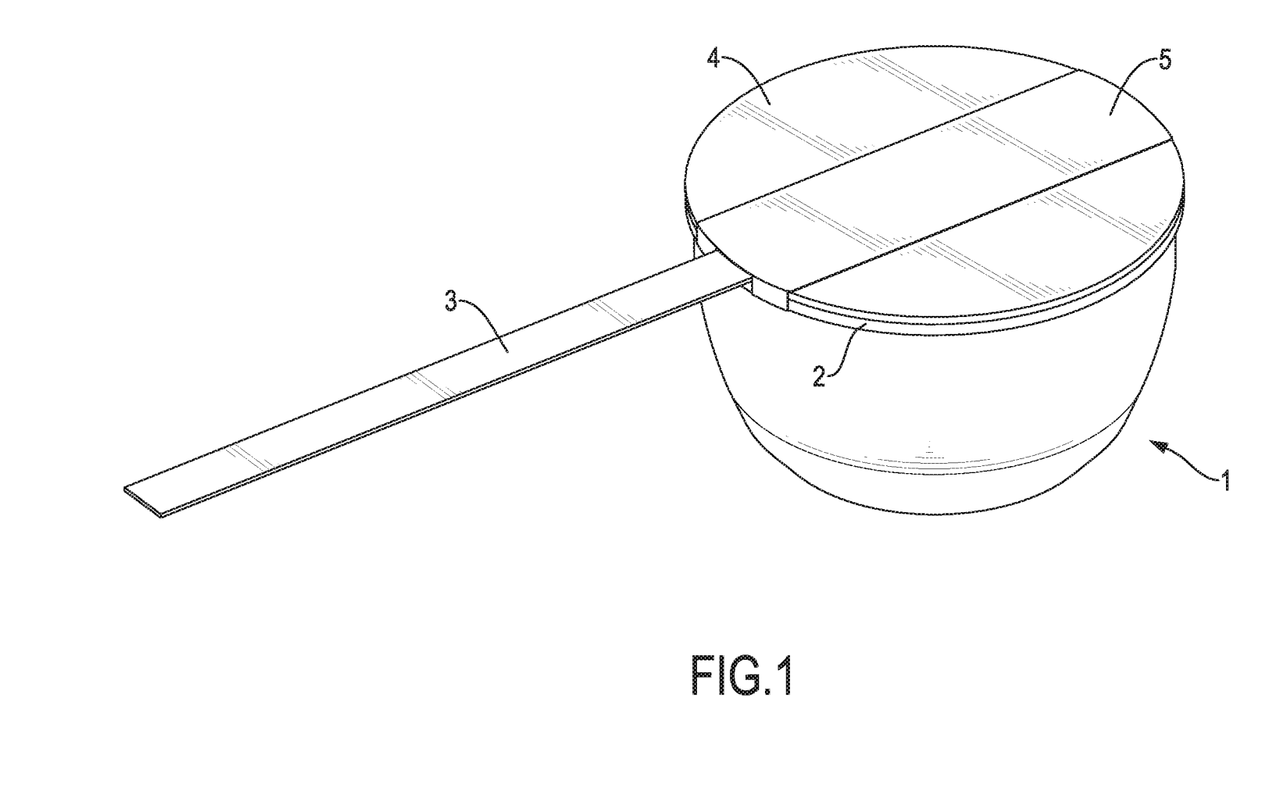
FIG. 1 is a perspective view of a first embodiment of a package structure for welding powder in accordance with the present invention.
Figure 2:
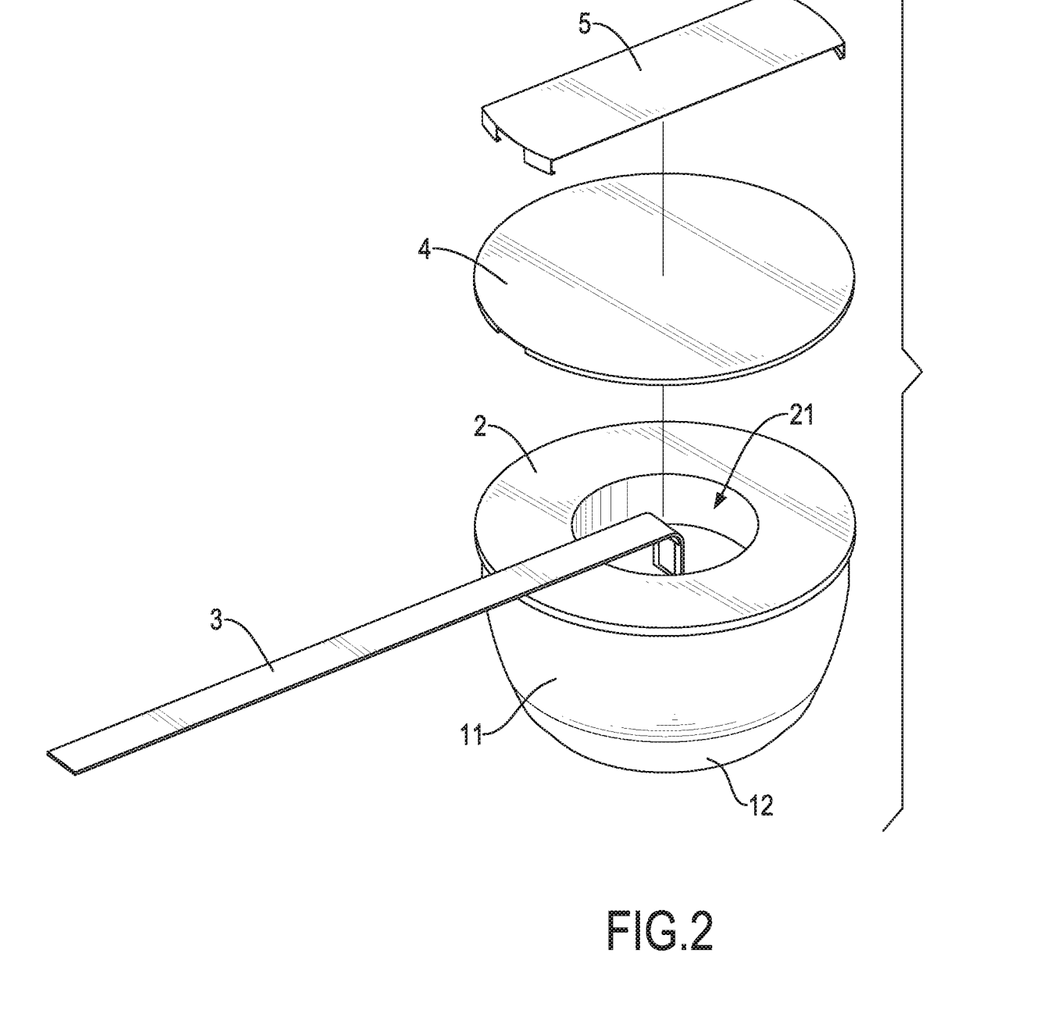
FIG. 2 is an exploded perspective view of the package structure in FIG. 1.
Figure 3:
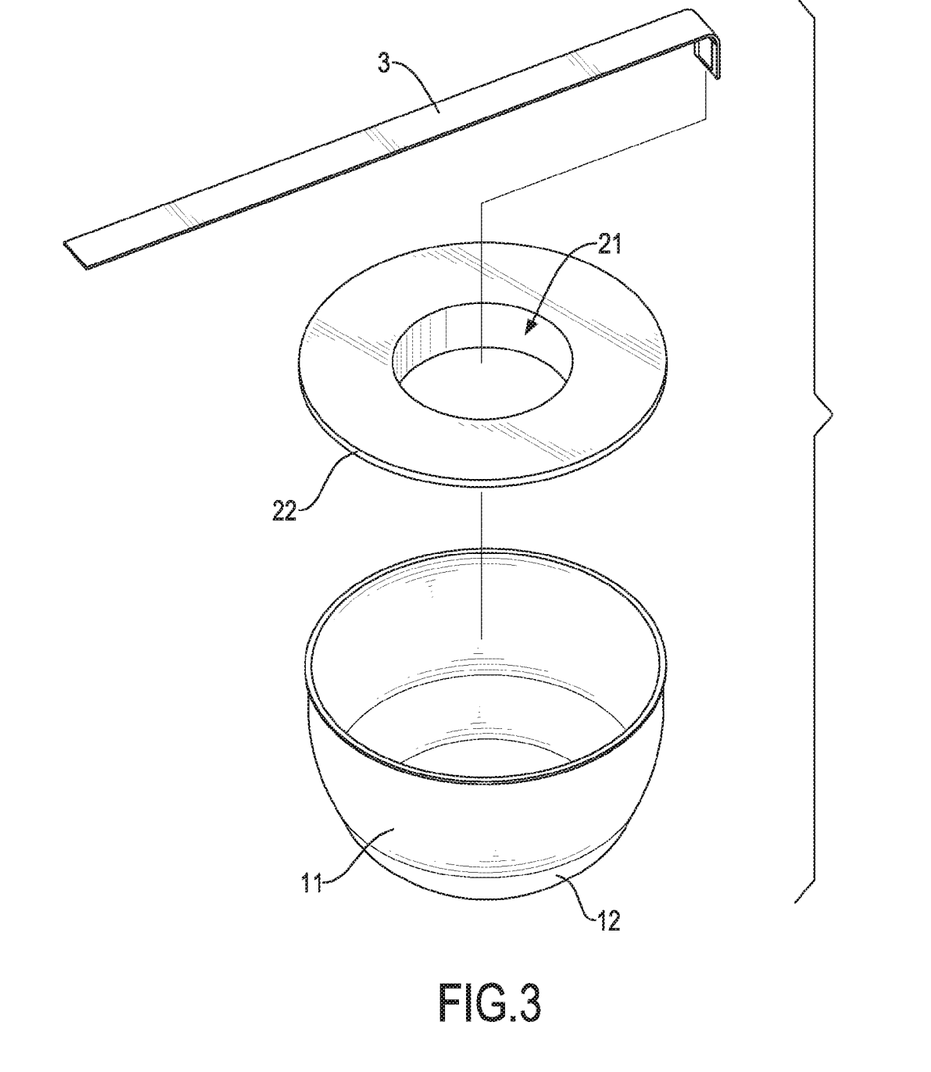
FIG. 3 is a further exploded top perspective view of the package structure in FIG. 2.
Figure 4:
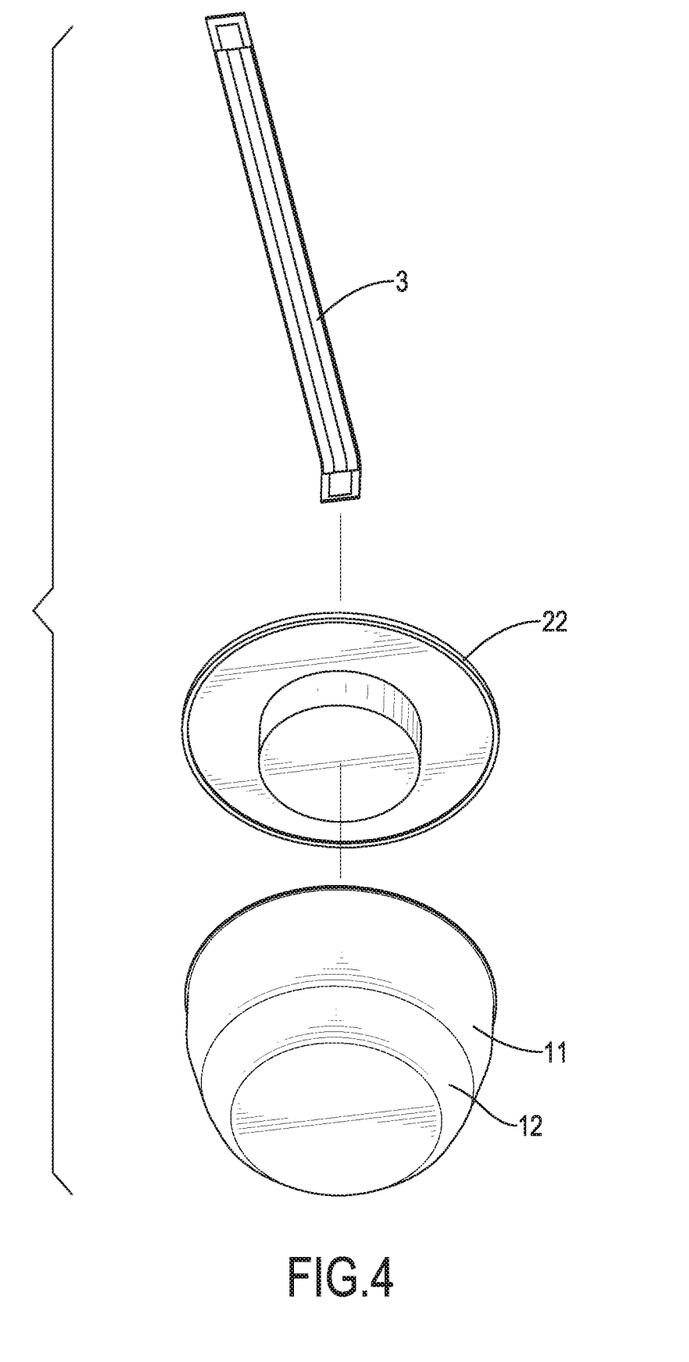
FIG. 4 is a further exploded bottom perspective view of the package structure in FIG. 2.
Figure 5:
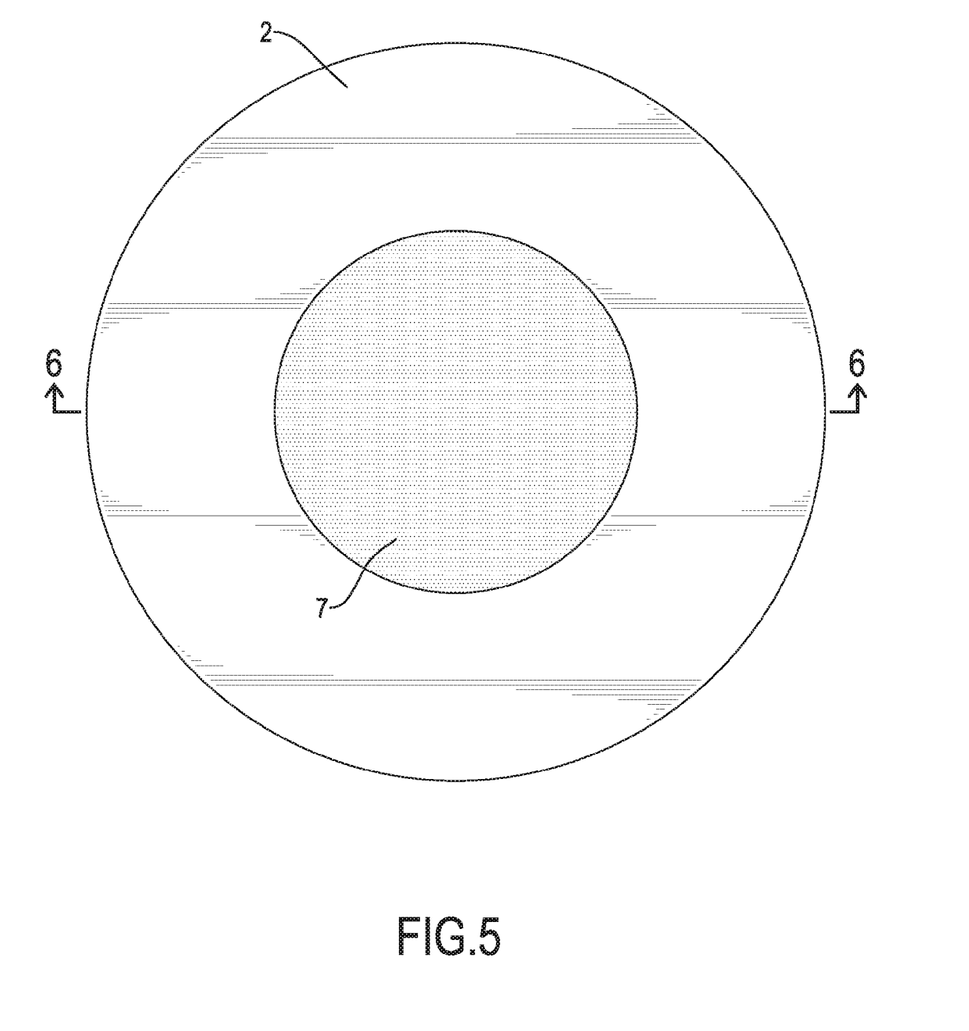
FIG. 5 is an enlarged top side view of a casing and a casing cover of the package structure in FIG. 1, with welding powder added in the package structure.

The mounting recess 21 may be round, is formed in the top surface of the casing cover 2 at a position on which the protruding segment of the casing cover 2 is formed, and has a top opening. With reference to FIGS. 5 and 6, the mounting recess 21 can be used to store fine welding powder 7. With reference to FIG. 6, the outer periphery 22 of the casing cover 2 is wound around the outer rim of the casing 1 to connect and seal the casing cover 2 securely with the casing 1. Further, a tin layer is electroplated on the external surfaces of the casing 1 and the casing cover 2 to provide an antirust effect.

Additionally, the package structure further has a fire strip 3, a sealing sheet 4, and a reinforcing member. The fire strip 3 is deposited on the top surface of the casing cover 2 and extends into the mounting recess 21 via the top opening of the mounting recess 21. The sealing sheet 4 is deposited on the top surface of the casing cover 2 to hold the fire strip 3 securely with the casing cover 2, and seals the top opening of the mounting recess 21. In addition, the sealing sheet 4 may be a metal film, a plastic film or a paper film, and is pasted on the top surface of the casing cover 2 by glue. In the first embodiment, the reinforcing member is a metal sheet 5, and the metal sheet 5 is deposited on the sealing sheet 4 to locate and fix the fire strip 3 securely on the casing cover 2, and has two free ends curved downwardly and connected to the casing 1.

With reference to FIGS. 7 and 8, when welding copper cables by the package structure, the copper cables are deposited in a bottom chamber of the welding mold 6, and the bottom chamber of the welding mold 6 is deposited below and communicates with the cavity of the welding mold 6. The package structure is deposited in the cavity of the welding mold 6 above the copper cables, and a mold cover 61 covers the cavity of the welding mold 6. The fire strip 3 has two ends, one of the ends of the fire strip 3 is inserted into the fine welding powder 7 that is stored in the mounting recess 21 of the casing cover 2, and the other end of the fire strip 3 extends out of the welding mold 6 between the mold cover 61 and a mold body of the welding mold 6.

An electric ignition device is connected to the end of the fire strip 3 that extends out of the welding mold 6 to ignite the fire strip 3. Then, the fine welding powder 7 that is stored in the mounting recess 21 of the casing cover 2 is burned to melt the casing cover 2, and the welding powder 9 that is stored in the casing 1 is also burned. When the fine welding powder 7, the package structure, and welding powder 9 are melted as copper water, the copper water flows into the bottom chamber of the welding mold 6 to connect the copper cables by a fusion welding.

Figure 9:
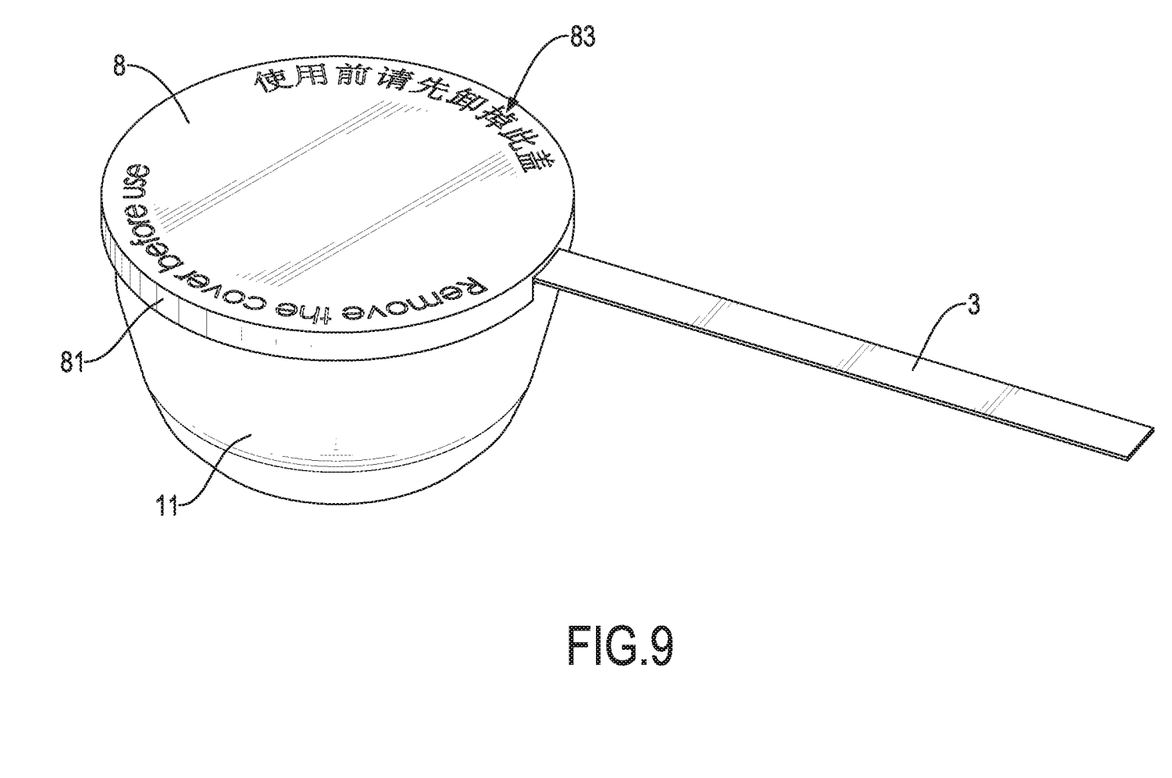
FIG. 9 is a perspective view of a second embodiment of a package structure for welding powder in accordance with the present invention.
Figure 10:
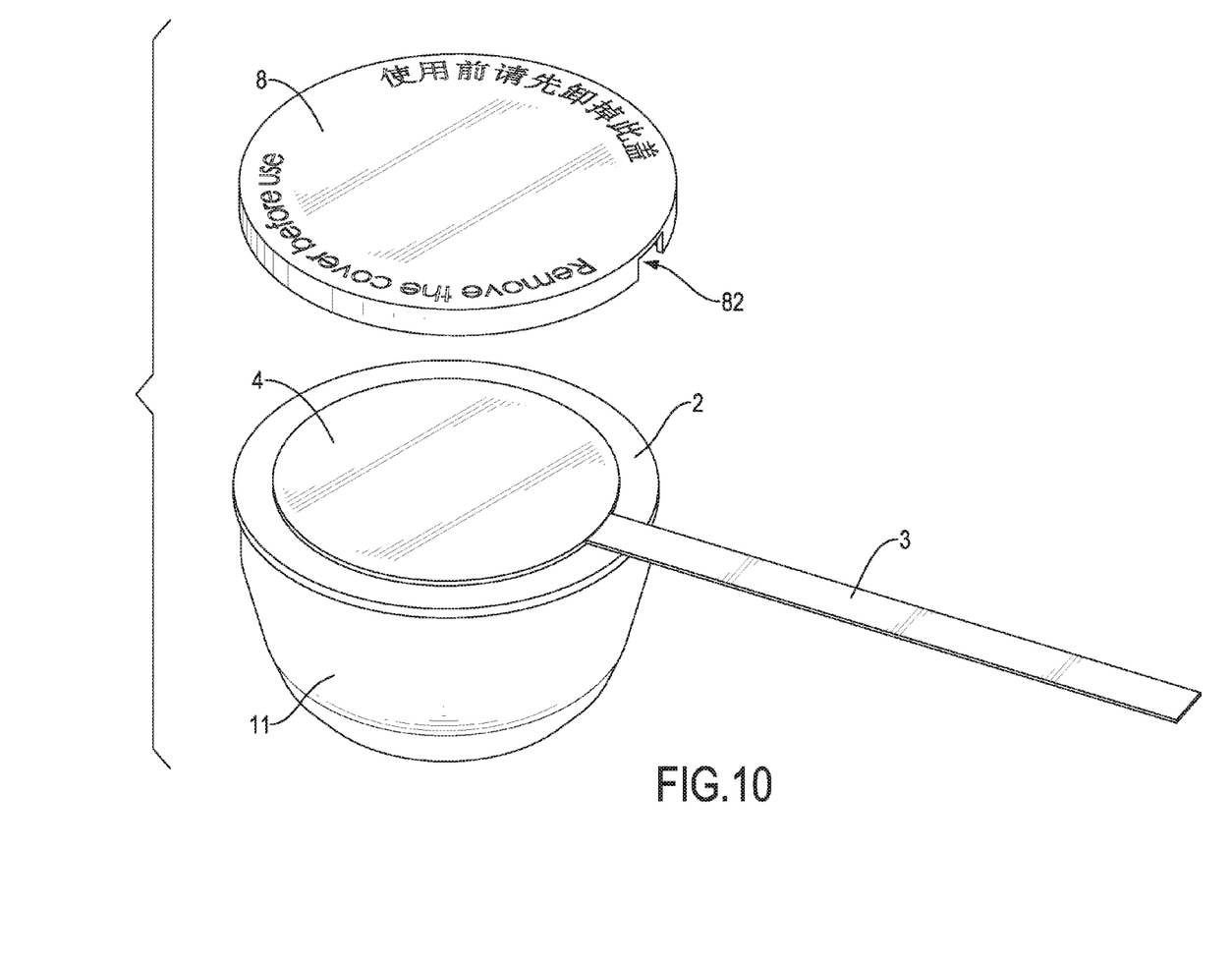
FIG. 10 is an exploded perspective view of the package structure in FIG. 9.
Figure 11:
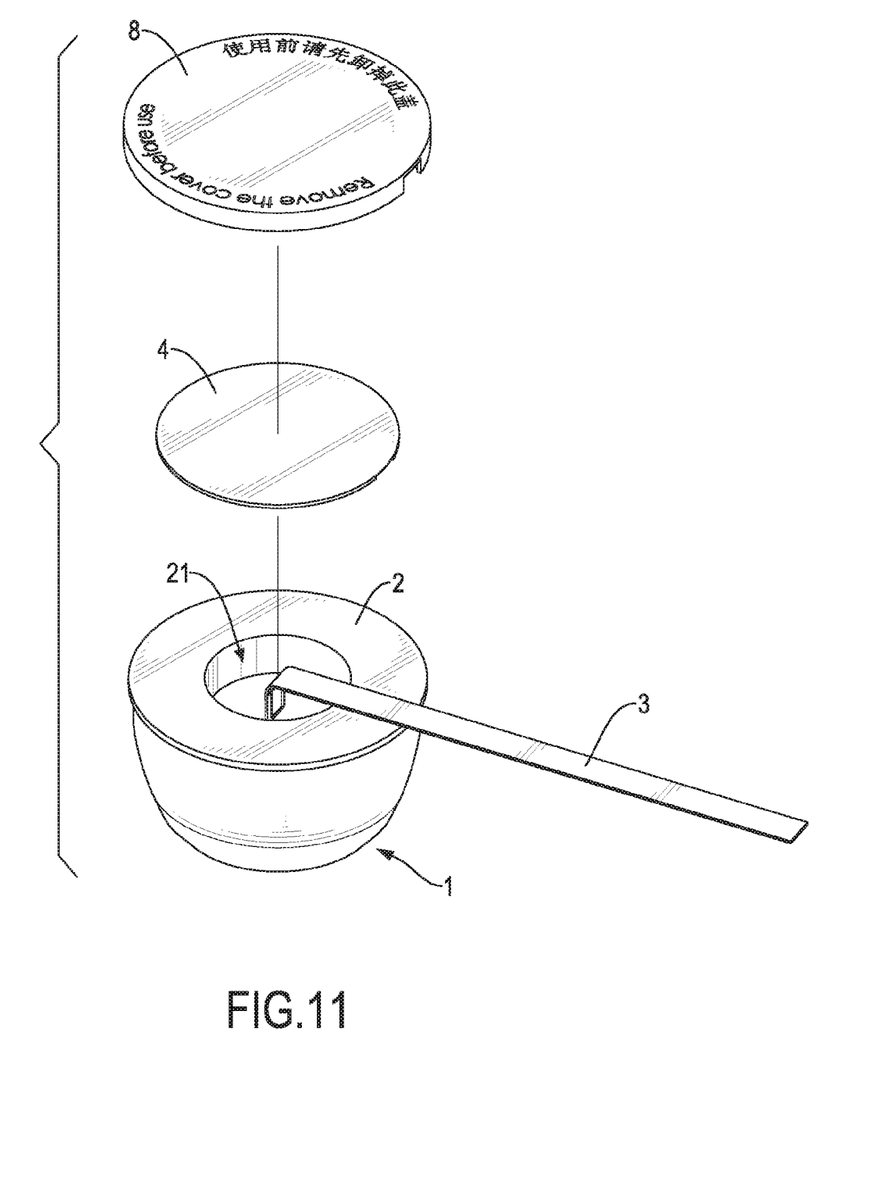
FIG. 11 is a further exploded perspective view of the package structure in FIG. 10.

With reference to FIGS. 9 to 11, a second embodiment of a package structure for welding powder in accordance with the present invention is substantially the same as the first embodiment except for the following features. In the second embodiment of the package structure, the reinforcing member is a protecting cover 8, and the protecting cover 8 is used to replace the metal sheet 5 and is detachably deposited on the sealing sheet 4 to hold the fire strip 3 securely with the casing cover 2 and to prevent the sealing sheet 4 from breaking. Furthermore, a bottom surface of the protecting cover 8 abuts or presses against a top surface of the sealing sheet 4.

The protecting cover 8 may be a transparent lid and may be made of a polyester material, and has a top surface, an outer periphery, a longitudinal flange 81, a side opening 82, and a reminding symbol 83. The longitudinal flange 81 is formed on and protrudes downwardly from the outer periphery of the protecting cover 8, and securely engages with the casing cover 2. The side opening 82 is formed through the longitudinal flange 81 and has a shape corresponding to the shape of the fire strip 3 to enable the fire strip 3 to extend out of the package structure between the casing cover 2 and the sealing sheet 4. Furthermore, the protecting cover 8 has a protruding ring formed on and protruding from the bottom surface of the protecting cover 8. The protruding ring of the protecting cover 8 may engage with an inner side of the casing cover 2 when the protecting cover 8 is deposited on the sealing sheet 4, and this may improve the stability between the protecting cover 8 and the casing cover 2. The reminding symbol 83 is formed on the top surface of the protecting cover 8 to remind users to remove the protecting cover 8 from the casing cover 2 before a welding process.

When the second embodiment of the package structure is in use, the operation is substantially the same as the above-mentioned operation of the first embodiment as shown in FIGS. 7 and 8 except for the following features. The protecting cover 8 is removed from the sealing sheet 4 and the casing cover 2 before the package structure is disposed in the cavity of the welding mold 6. Then, the subsequent operation is the same as the above-mentioned operation of the first embodiment as shown in FIGS. 7 and 8.

According to the above-mentioned embodiments of the package structure in accordance with the present invention, the package structure has the casing 1 and the casing cover 2 deposited on the casing 1, and the casing 1 and the casing cover 2 are made of metallic copper, and the package structure characterized in that: the protruding segment is formed on and protrudes from the bottom surface of the casing cover 2, the mounting recess 21 is formed in the top surface of the casing cover 2 corresponding to the protruding segment of the casing cover 2 and is used to store fine welding powder 7, and the sealing sheet 4 is deposited on the top surface of the casing cover 2 to hold the fire strip 3 securely with the casing cover 2 and seals the top opening of the mounting recess 21.

Furthermore, the thicknesses of the casing 1 and the casing cover 2 are thin to melt easily and quickly, and this may improve the processing efficiency. At the same time, the above-mentioned ranges of thickness of the casing 1 and the casing cover 2 may ensure complete melting of the casing 1 and the casing cover 2 and pouring of the melted casing 1 and casing cover 2 on the copper cables without waste to save resources for environmental protection.

Additionally, when using the metal sheet 5 deposited on the sealing sheet 4 to hold the fire strip 3, the two ends of the metal sheet 5 are curved downwardly and securely connected to the casing 1, and the above-mentioned structure of the metal sheet 5 may prevent the sealing sheet 4 separating from the casing cover 2 and may hold the fire strip 3 securely with the casing cover 2, and this is conducive to ignition and may reinforce the sealing structure between the casing 1 and the casing cover 2 to protect the fine welding powder 7 and the welding powder 9 from moisture to extend the life of the package structure. Furthermore, when in use, the protecting cover 8 is detachably deposited on the sealing sheet 4 to hold the fire strip 3 securely with the casing cover 2 and to prevent the sealing sheet 4 from breaking, and the bottom surface of the protecting cover 8 abuts against the top surface of the sealing sheet 4.

The sealing sheet 4 may be deposited on the top surface of the casing cover 2 by glue, and the glue may be adhesive stickers or sticky tabs to completely torn off the sealing sheet 4. The thickness of the sealing sheet 4 is thin and does not push the mold cover 61 up when deposited on the casing cover 2, and this may ensure the safety of process and the preferred sealing effect may prevent the fine welding powder 7 deteriorating. In addition, as the tin layer is electroplated on the external surfaces of the casing 1 and the casing cover 2, the tin layer may prevent the casing 1 and the casing cover 2 from corroding and rusting to extend the shelf-life time of the fine welding powder 7 and the welding power 9. Furthermore, the conductive property of tin is better than the conductive property of copper, and the tin layer is melted and flows with the copper water to a welding position between the copper cables, and this may improve the conductivity of the copper cables.

With respect to the above-mentioned related art, in the package structure of the present invention, the protruding segment is formed on the bottom surface of the casing cover 2 to form the mounting recess 21 in the top surface of the casing cover 2 to store the fine welding powder 7, and the sealing sheet 4 is deposited on the top surface of the casing cover 2 to hold the fire strip 3 securely with the casing cover 2, and seals the top opening of the mounting recess 21. The above-mentioned structural relationship may dispense the welding powder into the casing 1 and the casing cover 2, that is, the fine welding powder 7 is stored in the mounting recess 21 of the casing cover 2, and the welding powder 9 is stored in the casing 1. The fire strip 3 is inserted into the fine welding powder 7, and the welding powder 9 that is stored in the casing 1 is ignited via the high temperature that is formed by the combustion of the fine welding powder 7, and this may achieve the purpose of one-time ignition.

Although the manufacturing cost of the fine welding powder 7 is higher than the manufacturing cost of the welding powder 9, the fine welding powder 7 is stored in the mounting recess 21 of the casing cover 2 and has a smaller volume than the volume of the welding powder 9 that is stored in the casing 1. In addition, the ignition effect of the fine welding powder 7 is better than that of the welding powder 9, and this may reduce the requirement of particle sizes of the welding powder 9 in the casing 1 and also reduce the overall cost of manufacture.

Furthermore, using the casing-like structure of the package structure is convenient in transportation and may effectively prevent the fine welding powder 7 and the welding powder 9 from contact with the fire, making the transportation safer. In use, the user only needs to put the package structure in the cavity of the welding mold 6, and during the welding process, the package structure is melted as the copper water and becomes a part of the welding powders 7, 9 to form with the copper cables as a single piece without any residues of the casing 1 or casing cover 2, and this is convenient in use and is clean and environmentally friendly.

Additionally, the user doesn't need to add fine copper wires into the welding powder 9 since the casing 1 and the casing cover 2 are made of metallic copper and can be used to replace the fine copper wires, and this may effectively reduce the manufacturing cost of the welding powders 7, 9.

In addition, the casing 1 and casing cover 2 are made of metallic copper without mixing with iron during the welding process, and this may improve the conductivity and welding strength. Furthermore, the casing 1 and the casing cover 2 are needed to absorb heat during the melting and welding process, and this may effectively reduce the damage to the welding mold 6 and extends the life of the welding mold 6. Further, when the user needs to ignite the welding powders 7, 9, the user only needs to connect the fire strip 3 with the ignition-electric device to ignite the welding powders 7, 9 without using the pyrophoric powder, and this is convenient and safe in operation. Certainly, the package structure in the present invention not only can be used to weld the copper cables, but also can be used to weld iron cables or other metal cables, specified according to the actual circumstances.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A package structure for welding powder comprising:
   a casing made of metallic copper;
   a casing cover made of metallic copper, deposited on the casing, and having
   a bottom surface;
   a top surface;
   a protruding segment formed on and protruding from the bottom surface of the casing cover; and
   a mounting recess formed in the top surface of the casing cover at a position on which the protruding segment of the casing cover is formed to store fine welding powder, and having a top opening;
   a fire strip deposited on the top surface of the casing cover and extending into the mounting recess via the top opening of the mounting recess; and
   a sealing sheet deposited on the top surface of the casing cover to hold the fire strip securely with the casing cover, and sealing the top opening of the mounting recess.

2. The package structure as claimed in claim 1, wherein the protruding segment is cylindrical and is formed on and protrudes from the bottom surface of the casing cover at a center of the casing cover; and
   the mounting recess is round and is formed in the top surface of the casing cover at the center of the casing cover.

3. The package structure as claimed in claim 2, wherein the casing cover has a thickness between 0.1 and 0.3 millimeters;
   the protruding segment of the casing cover has a thickness equal to the thickness of the casing cover; and
   the casing has a thickness between 0.1 and 0.5 millimeters.

4. The package structure as claimed in claim 3, wherein the package structure has a reinforcing member deposited on the sealing sheet to hold the fire strip securely with the casing cover, and the reinforcing member is one selected from a metal sheet and a protecting cover;

wherein when the reinforcing member is the metal sheet, the metal sheet is deposited on the sealing sheet to locate and fix the fire strip securely on the casing cover and has two free ends curved downwardly and connected to the casing; and wherein when the reinforcing member is the protecting cover, the protecting cover is detachably deposited on the sealing sheet to hold the fire strip securely with the casing cover and to prevent the sealing sheet from breaking.

5. The package structure as claimed in claim 3, wherein the sealing sheet is a metal film, a plastic film or a paper film, and is pasted on the top surface of the casing cover by glue.

6. The package structure as claimed in claim 4, wherein the sealing sheet is a metal film, a plastic film or a paper film, and is pasted on the top surface of the casing cover by glue.

7. The package structure as claimed in claim 1, wherein the casing cover has an outer periphery wound around an outer rim of the casing to connect and seal the casing cover securely with the casing.

8. The package structure as claimed in claim 2, wherein the casing cover has an outer periphery wound around an outer rim of the casing to connect and seal the casing cover securely with the casing.

9. The package structure as claimed in claim 1, wherein the package structure has a tin layer electroplated on external surfaces of the casing and the casing cover to provide an antirust effect.

10. The package structure as claimed in claim 2, wherein the package structure has a tin layer electroplated on external surfaces of the casing and the casing cover to provide an antirust effect.

11. The package structure as claimed in claim 1, wherein the casing has a shape being conical to correspond to a shape of a cavity of a welding mold.

12. The package structure as claimed in claim 2, wherein the casing has a shape being conical to correspond to a shape of a cavity of a welding mold.

13. The package structure as claimed in claim 1, wherein
the casing is composited by an upper tapered segment and a lower tapered segment, and the upper tapered segment and the lower tapered segment are formed as a single piece by single stage stamping; and
the protruding segment is formed with the casing cover as a single piece by stamping.

14. The package structure as claimed in claim 2, wherein
the casing is composited by an upper tapered segment and a lower tapered segment, and the upper tapered segment and the lower tapered segment are formed as a single piece by single stage stamping; and
the protruding segment is formed with the casing cover as a single piece by stamping.

15. The package structure as claimed in claim 3, wherein
the casing is composited by an upper tapered segment and a lower tapered segment, and the upper tapered segment and the lower tapered segment are formed as a single piece by single stage stamping; and
the protruding segment is formed with the casing cover as a single piece by stamping.

16. The package structure as claimed in claim 4, wherein
the casing is composited by an upper tapered segment and a lower tapered segment, and the upper tapered segment and the lower tapered segment are formed as a single piece by single stage stamping; and
the protruding segment is formed with the casing cover as a single piece by stamping.

17. The package structure as claimed in claim 13, wherein
an included angle at a connecting position between the upper tapered segment and the lower tapered segment is between 130 and 140 degrees; and
a taper angle of the lower tapered segment is between 145 and 160 degrees.

18. The package structure as claimed in claim 14, wherein
an included angle at a connecting position between the upper tapered segment and the lower tapered segment is between 130 and 140 degrees; and
a taper angle of the lower tapered segment is between 145 and 160 degrees.

19. The package structure as claimed in claim 15, wherein
an included angle at a connecting position between the upper tapered segment and the lower tapered segment is between 130 and 140 degrees; and
a taper angle of the lower tapered segment is between 145 and 160 degrees.

20. The package structure as claimed in claim 16, wherein
an included angle at a connecting position between the upper tapered segment and the lower tapered segment is between 130 and 140 degrees; and
a taper angle of the lower tapered segment is between 145 and 160 degrees.

* * * * *